United States Patent
Kirbs et al.

(10) Patent No.: US 11,293,563 B2
(45) Date of Patent: Apr. 5, 2022

(54) CONTROL VALVE

(71) Applicant: SAMSON AG, Frankfurt am Main (DE)

(72) Inventors: Uwe Kirbs, Frankfurt (DE); Domagoj Vnucec, Ilvesheim (DE)

(73) Assignee: SAMSON AG, Frankfurt am Main (DE)

( * ) Notice: Subject to any disclaimer, the term of this patent is extended or adjusted under 35 U.S.C. 154(b) by 5 days.

(21) Appl. No.: 16/108,740

(22) Filed: Aug. 22, 2018

(65) Prior Publication Data

US 2019/0137001 A1 May 9, 2019

(30) Foreign Application Priority Data

Aug. 22, 2017 (DE) ...................... 20 2017 105 035.1

(51) Int. Cl.
*F16K 41/02* (2006.01)
*F16K 37/00* (2006.01)
(Continued)

(52) U.S. Cl.
CPC ............. *F16K 41/02* (2013.01); *F16J 15/184* (2013.01); *F16K 1/34* (2013.01); *F16K 31/1262* (2013.01); *F16K 37/0041* (2013.01); *H05F 3/02* (2013.01)

(58) Field of Classification Search
CPC .. F16K 41/02; F16K 31/1262; F16K 37/0041; F16K 1/34; F16J 15/184; F16J 9/06; F16J 9/062; H05F 3/02
(Continued)

(56) References Cited

U.S. PATENT DOCUMENTS 730,381 A * 6/1903 Maddox ................. F16J 15/184
277/520
4,474,356 A * 10/1984 Baumann .................. F16K 1/34
251/122
(Continued)

FOREIGN PATENT DOCUMENTS

DE   23 28 995 A   1/1974
DE   3722816 A1    1/1989
(Continued)

OTHER PUBLICATIONS

German Search Report dated Mar. 6, 2018, by the German Patent Office in corrsponding German application DE 20 2017 105 035.1, 5 pages in German.
(Continued)

*Primary Examiner* — Craig J Price
*Assistant Examiner* — Andrew J Rost
(74) *Attorney, Agent, or Firm* — Juan Carlos A. Marquez; Marquez IP Law Office, PLLC

(57) ABSTRACT

The invention relates to a control valve for adjusting a process fluid flow of a process plant, comprising a valve housing with a valve seat and a valve member connected to a valve rod, which cooperates with the valve seat for opening and closing the control valve, wherein the valve rod is electrically connected to the valve housing through a contact device. The invention is characterized in that a measuring device for the ohmic transition resistance measurement of the contact device is provided, and that the measuring device is arranged in a measuring line that connects the valve housing to the valve rod.

8 Claims, 3 Drawing Sheets

(51) Int. Cl.
*F16J 15/18* (2006.01)
*F16K 31/126* (2006.01)
*F16K 1/34* (2006.01)
*H05F 3/02* (2006.01)

(58) Field of Classification Search
USPC .......................................... 277/919; 251/214
See application file for complete search history.

(56) References Cited

U.S. PATENT DOCUMENTS

| | | | | |
|---|---|---|---|---|
| 4,640,305 A * | 2/1987 | Johnson | .................. | F16J 15/186 137/312 |
| 4,886,241 A * | 12/1989 | Davis | .................... | F16J 15/166 251/214 |
| 4,890,937 A * | 1/1990 | Balsells | .................. | F16C 27/02 277/589 |
| 4,915,366 A * | 4/1990 | Balsells | .................. | F16F 1/045 267/167 |
| 5,134,244 A * | 7/1992 | Balsells | .................. | F16F 1/045 174/352 |
| 5,542,682 A * | 8/1996 | Goldstein | ............ | F16J 15/3212 267/1.5 |
| 5,791,629 A * | 8/1998 | Wears | .................... | F16K 41/02 251/214 |
| 6,749,358 B2 * | 6/2004 | Balsells | ............... | H01R 13/187 403/315 |
| 9,293,849 B2 * | 3/2016 | Balsells | .................. | H01R 13/03 |
| 2006/0096643 A1 * | 5/2006 | McCarty | .................. | F16K 1/34 137/625.3 |
| 2006/0127170 A1 * | 6/2006 | Balsells | .................. | F16B 21/18 403/225 |
| 2010/0050786 A1 | 3/2010 | Kiesbauer et al. | | |

FOREIGN PATENT DOCUMENTS

| | | |
|---|---|---|
| DE | 39 25 888 A1 | 2/1991 |
| DE | 195 28 127 C2 | 5/2000 |
| DE | 10 2006 033 209 B3 | 11/2007 |
| DE | 10 2007 031 141 B4 | 2/2009 |
| DE | 10 2015 016 357 A1 | 6/2017 |
| EP | 0 096 366 A2 | 5/1983 |
| EP | 0 308 390 A1 | 3/1989 |
| GB | 186 526 A | 10/1922 |
| JP | 0000S5911230 Y2 | 4/1984 |
| JP | 000H01169188 A | 7/1989 |
| JP | 000H02122277 U | 10/1990 |

OTHER PUBLICATIONS

European Search Repod dated Jan. 16, 2019, by the European Patent Office in corresponding European application EP 18 19 0172.9, 7 pages in German.

* cited by examiner

CONTROL VALVE

The invention relates to a control valve for adjusting a process fluid flow in a process plant, comprising a valve housing having a valve seat, a lifting rod mounted on the valve housing and bearing a valve member which cooperates with the valve seat for opening and closing the control valve.

Static charges in or on the valve may lead to the formation of sparks and thus result in a critical condition. Therefore, it must be ensured that the valve body is safely grounded with the pipe in every position, even though, in the open state of the valve, there is no direct contact to the housing via a metal valve seat.

FP 0 096 366 A2 relates to an electrostatic draining device for cocks with a spherical surface having a contact element between a ball valve and a spindle, and a second contact element between the spindle and a stuffing box or a nut, wherein at least the contact element between the ball and the spindle consists of two metal pins that are guided in a bushing and are pressed into contact with the ball and with the spindle by means of a spring arranged between the two metal pins so that the spring is not exposed to aggressive fluids. This arrangement for draining electrostatic energy is not suitable for the above mentioned control valves, it is of a complex design and prone to a certain amount of abrasion.

Such abrasion would also be generated by an electrical contact switch of the type described in DE10 2006 033 209 B3, for example. In the embodiments set out in this document, annular springs are disposed in grooves that contact a non-contoured counterpart. Because the spring tension is directed toward the groove, the spring will be urged into the groove, thus ensuring that it is securely held in the groove. The pressing forces ensure contact over a large area so that a high power can be transmitted safely.

It is the object of the invention to provide a control valve of the aforementioned type which enables low-friction contacting of an axially movable lifting rod.

This object is accomplished by a control valve having the features of claim 1. Advantageous embodiments of the invention are defined in the sub-claims.

The control valve according to the invention is characterized in that, for electrically contacting the lifting rod, a stationary contact holder is mounted opposite the lifting rod. In operation, the lifting rod performs an axial movement relative to the contact holder which is fixed to the valve housing. In the axial direction, on either side and in an electrically conductive manner, the contact holder holds an electrically conductive annular coil that is axially movably mounted in the contact holder, with the annular spring extending around the lifting rod. The lifting rod serves to improve electrical contact between the lifting rod of the positioner and the valve housing. In this case, the annular spring is capable of moving to such an extent in the axial direction, both relative to the lifting rod and within an axial limit of the contact holder, that the annular spring can roll along the lifting rod in the contact holder. According to the invention, it is considered particularly advantageous for the annular spring to roll on the lifting rod for minimum friction, thus resulting in almost zero wear. For this purpose, the preload of the annular spring is selected so that it is pressed against the lifting rod, which is in particular non-contoured, whereby friction with the lifting rod sets the annular spring in a rolling motion if its axial movement is limited by the contacting device and the lifting rod moves beyond this range.

One advantageous embodiment of the invention is characterized in that the contact holder comprises a contact surface above the annular spring and/or a contact surface of a support part below the annular spring. The annular spring is axially limited on both sides by the upper contact surface and/or the lower contact surface. Depending on the direction of movement of the valve rod, the annular spring thus contacts the upper contact surface or the lower contact surface. This allows the annular spring to be in electrical contact with the lifting rod, on the one hand, and with the housing, on the other hand. This is a simple way of creating a galvanic connection from the valve housing to the lifting rod, thus preventing electrostatic charging between the parts.

In particular, the distance between the contact surface above the annular spring and the surface of the support part below the annular spring is larger than the cross-section of the annular spring so that, to a small extent, the annular spring can move freely in the contact holder and can move along with the lifting rod. This is a simple way of creating a reliable and low-friction galvanic connection from the valve housing to the lifting rod.

Another advantageous embodiment of the invention is characterized in that the upper contact surface is designed in the form of an annular groove of a clamping ring, The latter can be screwed into the valve housing. This has the advantage that the annular groove for the annular spring can readily be provided in the clamping ring that is used anyway for mounting a stuffing box packing in the valve housing, which simplifies manufacture.

Another advantageous embodiment of the invention is characterized in that the lower support part is arranged between the annular spring and a stuffing box packing which latter is disposed between the lifting nod and the valve housing. Because the stuffing box packing is provided in a blind hole in the valve housing anyway, this allows the support part to be accommodated without any additional construction effort.

Yet another advantageous embodiment of the invention is characterized in that the support part is formed by an electrically conducting annular member that is in electrical contact with the valve housing so that a conductive path is formed from the annular spring to the housing via the support part and the clamping ring.

Another advantageous embodiment of the invention is characterized in that the upper support surface comprises an annular spring element, said annular spring abutting the upper support surface, and that the upper contact surface is preloaded towards the annular spring. This ensures that the annular spring is permanently in contact with the lifting rod and/or—via the clamping ring—with the valve housing, and that rolling of the annular spring is still possible as the spring member is being urged away.

Another advantageous embodiment of the invention is characterized in that the annular spring is twisted in itself over its length so that the annular spring is permanently supported both on the upper contact surface of the valve housing and on the lower support part. Because of the twisted design of the annular spring, the various sections of the annular spring do not extend in one plane but what results is some kind of wave shape, thus ensuring that the annular spring is securely supported permanently both on the contact surface and on the support part, irrespective of the operating state of the lifting rod.

Another advantageous embodiment of the invention is characterized in that the annular spring is located in an annular groove in the clamping ring, which groove runs at an angle to a plane that is perpendicular to a longitudinal axis of the valve stem, so that the annular spring is permanently supported both on the upper contact surface of the valve housing and on a surface of the lower support part. The beveled design of the annular groove also advantageously ensures that the annular spring is permanently supported both on the contact surface and on the support part, independent of the actuation state of the lifting rod.

Additional advantages, features and possible applications of the present invention can be gathered from the description which follows, in which reference is made to the embodiments illustrated in the drawings.

Throughout the description, the claims and the drawings, those terms and associated reference characters are used as are indicated in the List of Reference Characters which follows below. As shown in the drawings:

Figure 1:
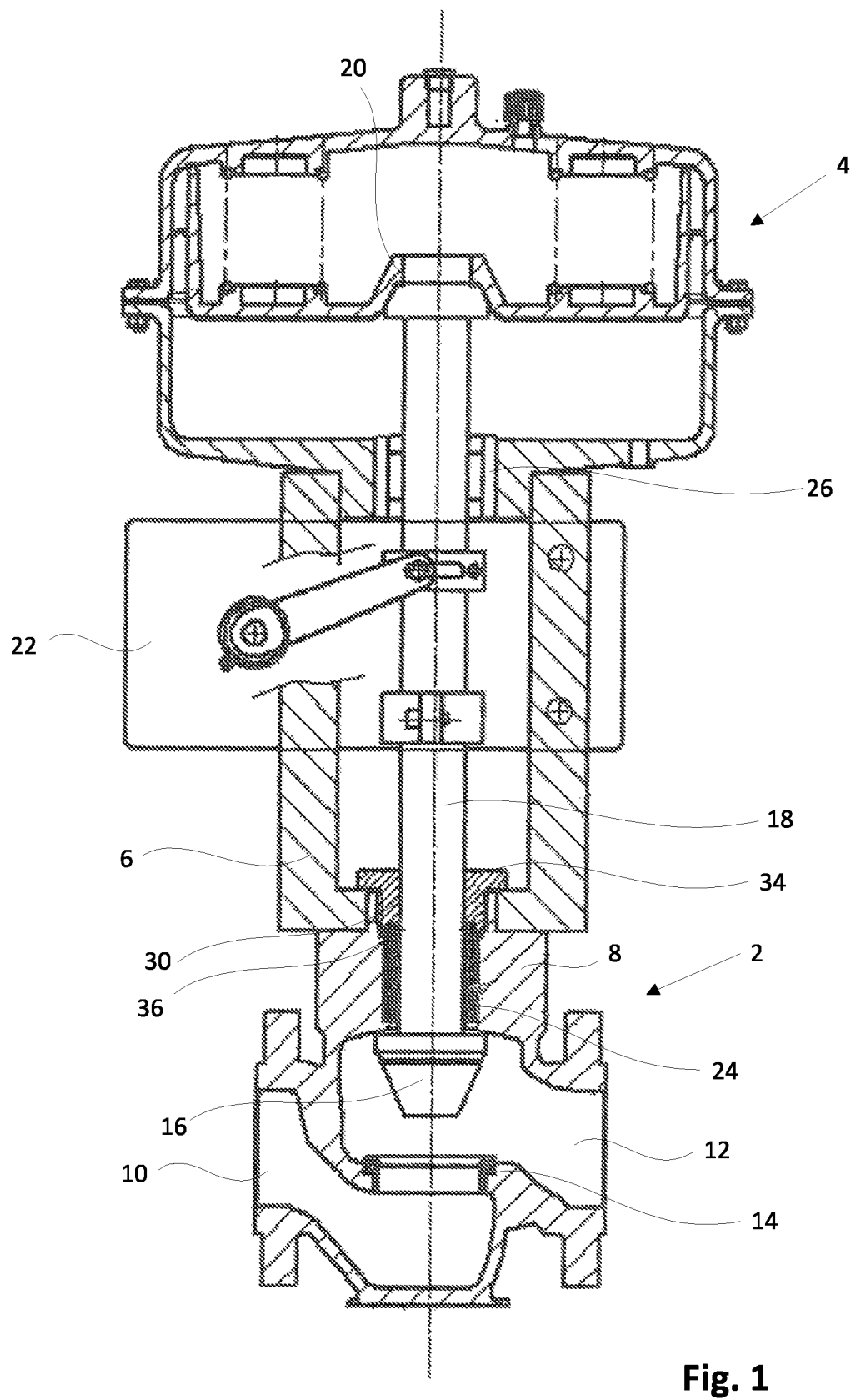
FIG. 1 is a lateral view of a control valve according to the invention.

The control valve 2 illustrated in the drawings comprises an actuating drive 4 and a valve housing 8 connected to the actuating drive 4 via a yoke 6 and having an inlet 10 and an outlet 12 and a valve opening 14 which can be closed or opened by means of a valve member 16, which is actuated by means of a lifting rod 18 connected to the valve member 16 and the actuating drive 4. For this purpose, the lifting rod 18 is connected to a diaphragm working member 20 of the actuating drive 4. In known manner, the control valve is completed by a positioner 22.

Figure 2:
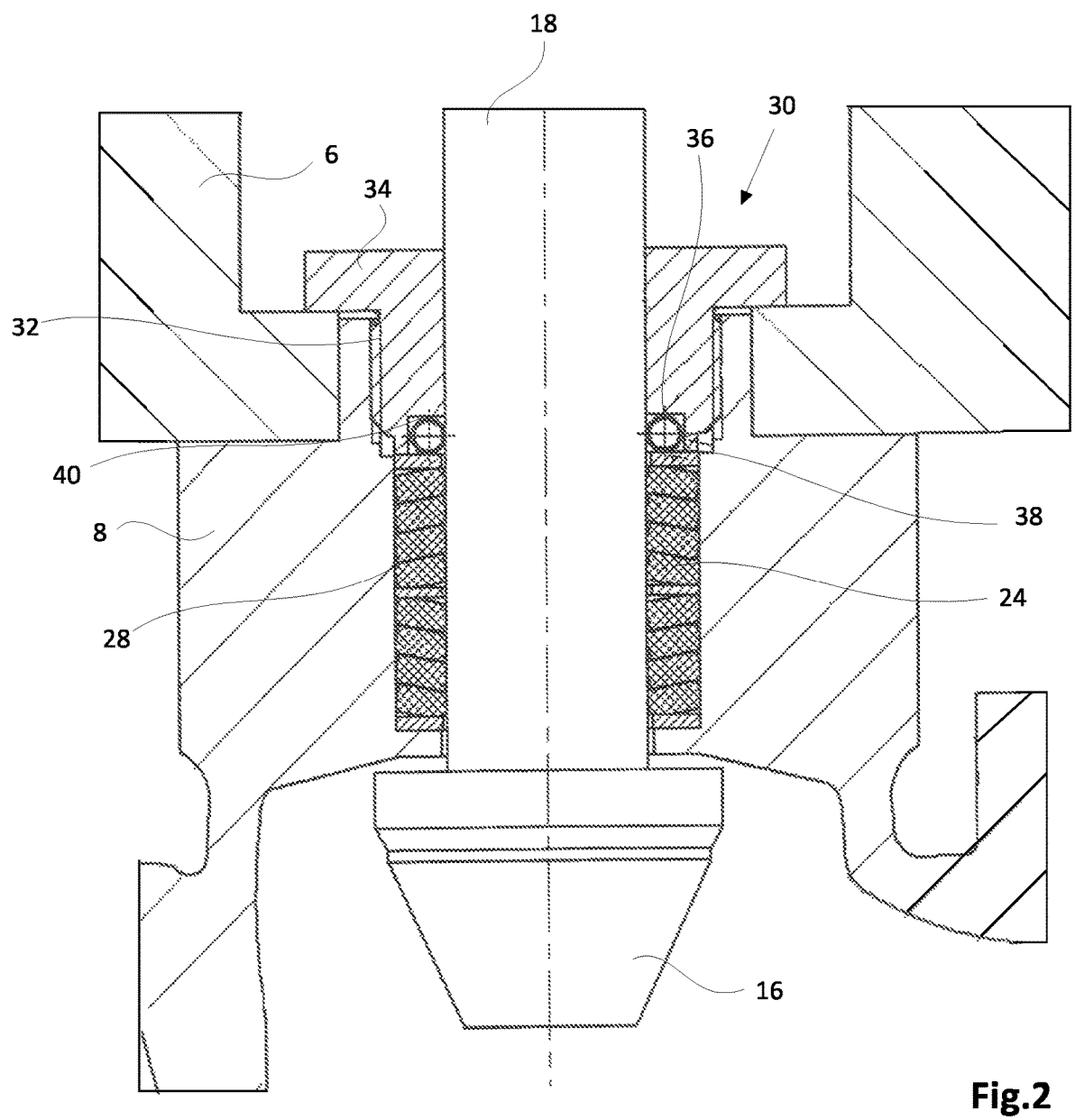
FIG. 2 is a detail view of the section of the inventive control valve which has the stuffing box packing for mounting the lifting rod.

As seen in FIGS. 1 and 2, the lifting rod 18 is mounted on the valve housing 8 via a stuffing box packing 24 and it is mounted on the actuating drive 4 via another bearing 26 (FIG. 1). The stuffing box packing 24 is arranged in a blind hole 28 of the valve housing 8 and is held by a clamping ring 30 which is screwed into the valve housing 8 via a threaded connection 32. A flange of the clamping ring 30 has an annular shoulder 34 that extends over the yoke 6.

As seen in FIGS. 1 and 2, a contact holder fixed opposite the lifting rod 18 is provided for the electrical contacting of the lifting rod 18 so that, in operation, the lifting rod 18 performs an axial movement relative to the contact holder. In the axial direction, the contact device holds, on both sides and in an electrically conductive manner, an annular spring 36 that is axially movably mounted in the contact holder. The contact holder is formed by the clamping ring 30 and an annular lower support part 38. The annular spring 36 is arranged between the clamping ring 30 and the stuffing box packing 24 where it engages around the lifting rod 18 under preload so that the annular spring 36 is held on the lifting rod 18 by the spring force, as will be explained in more detail with reference to FIGS. 3 to 5.

Figure 3:
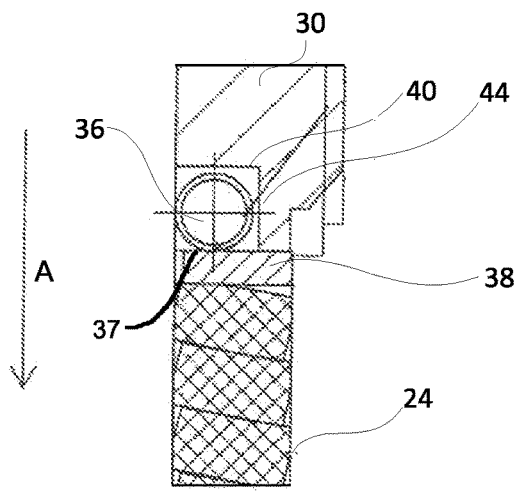
FIG. 3 is a first detail view of a section of an annular spring in the control valve according to the invention.

FIG. 3 is a detail view of the section of the control valve 2 according to the invention with the annular spring 36, which view shows that during a downward stroke (arrow A) of the lifting rod 18, the annular spring 36 makes contact with the lifting rod 18 and a surface 37 of the annular lower support part 38 which is located between the stuffing box packing 24 and the annular spring 36.

Figure 4:
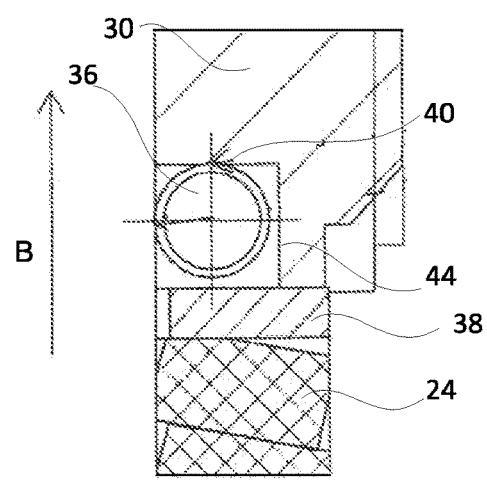
FIG. 4 is a second detail view of the section of the annular spring in the control valve according to the invention.

FIG. 4 is a detail view of the section of the control valve 2 according to the invention with the annular spring 36, which view shows that during an upward stroke (arrow B) of the lifting rod 18 the annular spring 36 makes contact with the lifting rod 18 and with an annular upper contact surface 40 of the clamping ring 30.

Figure 5:
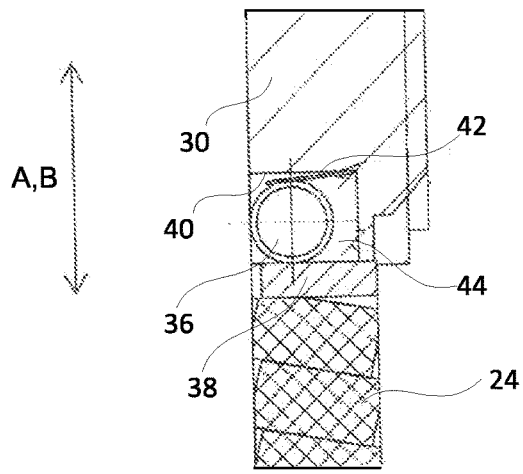
FIG. 5 is a third detail view of the section of the annular spring in the control valve according to the invention.

FIG. 5 is a third detail view of the section of the annular spring 36 in the control valve 2 according to the invention, which view shows that a thin annular spring element 42 is disposed between the annular spring 36 and the clamping ring 30 as an axial support so that the clamping ring 30 is in permanent contact with the annular spring 36 and the annular spring 36 is in permanent contact with the lifting rod 18, irrespective of the direction of movement of the lifting rod 18 (double arrow A, B), while still allowing some slight axial movement of the annular spring 36.

Figure 6:
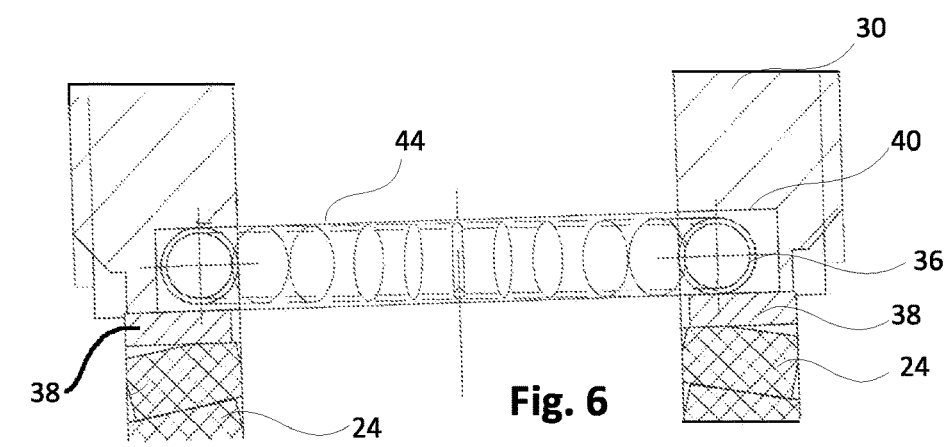
FIG. 6 is a first lateral view of the section of the annular spring in the control valve according to the invention.

FIG. 6 is a first lateral view of the section of an annular spring 36 in the control valve 2 according to the invention in which the annular spring 36 is twisted in itself so that it takes an wave-like shape, at the same time ensuring that the annular spring 36 is permanently supported by an annular groove 44 of the clamping ring 30 and by the support part 38.

Figure 7:
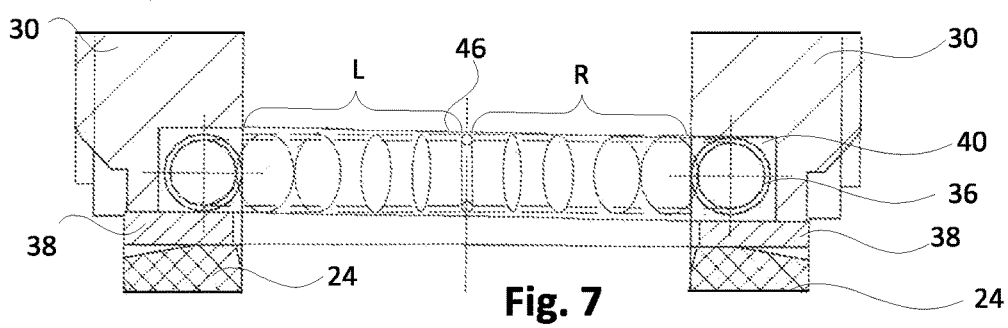
FIG. 7 is a second lateral view of the section of the annular spring in the control valve according to the invention.

FIG. 7 is a second lateral view of the section of an annular spring 36 in the control valve 2 according to the invention, in which case the annular spring 36 lies in an annular groove 46 in the clamping ring which extends at an angle to a plane that is perpendicular to a longitudinal axis of the valve stem so that the annular spring 36 is permanently supported both on the upper contact surface 40 of the valve housing 8 and on a surface 37 of the lower support part 38.

In the embodiment examples of the control valve, the annular spring 36, the clamping ring 30 and the support part 38 are made of a conductive material to keep the entire transition resistance between the lifting rod and the valve housing low.

Because the annular spring 36 rails on the lifting rod during a stroke movement, there is hardly any friction between the lifting rod and the annular spring which in particular prolongs the service life of the annular spring 36.

LIST OF REFERENCE CHARACTERS 2 control valve
4 actuating drive
6 yoke
8 valve housing
10 inlet
12 outlet
14 valve seat
16 valve member
18 lifting rod
20 diaphragm working
22 positioner
24 stuffing box packing
26 bearing
28 blind hole
30 clamping ring
32 threaded connection
34 flange
36 annular spring
37 surface
38 support part
40 contact surface
42 spring element 44 annular groove
46 annular groove

The invention claimed is:

1. A control valve for adjusting a process fluid flow of a process plant, comprising a valve housing with a valve seat, a lifting rod axially movably mounted on the valve housing and which carries a valve member that cooperates with the valve seat for opening and closing the control valve, wherein for electrically contacting the lifting rod, a contact holder mounted in a fixed position opposite to the lifting rod is provided that holds, in an electrically conductive manner on both sides in the axial direction, an electrically conductive annular spring mounted in the contact holder so as to be axially movable relative to a longitudinal axis of the lifting rod and, with the annular spring engaging in direct contact around the lifting rod, wherein the contact holder comprises an upper contact surface above the annular spring, and the upper contact surface includes an annular spring member configured to urge against the annular spring such that the annular spring is preloaded in the direction of the upper contact surface and movably rollable while in electrical contact with the upper contact surface.

2. A control valve for adjusting a process fluid flow of a process plant, comprising a valve housing with a valve seat, a lifting rod axially movably mounted on the valve housing and which carries a valve member that cooperates with the valve seat for opening and closing the control valve, wherein for electrically contacting the lifting rod, a contact holder mounted in a fixed position opposite to the lifting rod is provided that holds, in an electrically conductive manner on both sides in the axial direction, an electrically conductive annular spring mounted in the contact holder so as to be axially movable relative to a longitudinal axis of the lifting rod and, with the annular spring engaging in direct contact around the lifting rod, wherein the contact holder comprises a contact surface above the annular spring and/or a surface of a support part below the annular spring, and the contact holder is configured to urge against the annular spring such that the annular spring is preloaded in the direction of the contact surface above the annular spring and is movably rollable while in electrical contact with the contact surface above the annular spring.

3. A control valve according to claim 2, characterized in that the support part is constituted by an annular electrically conductive member which is in electric contact with the valve housing.

4. A control valve according to 2, characterized in that a distance between the contact surface above the annular spring and the surface of the support part below the annular spring is larger than the cross-section of the annular spring.

5. A control valve according to claim 2, wherein the contact surface above the annular spring is formed in an annular groove of a clamping ring which is part of the valve housing.

6. A control valve according to claim 2, characterized in that a lower radial support member is arranged between the annular spring and a stuffing box packing which is arranged between the lifting rod and the valve housing.

7. A control valve according to claim 2, characterized in that the annular spring is twisted in itself over its length, with the result that the annular spring is permanently supported both on the contact surface above the annular spring and on the support part below the annular spring.

8. A control valve according to claim 2, characterized in that the annular spring extends in an annular groove in a clamping ring, which groove runs at an angle relative to a plane that is perpendicular to a longitudinal axis of the lifting rod, with the result that the annular spring is permanently supported both on the contact surface above the annular spring and on the surface of the support part below the annular spring.

* * * * *